United States Patent
Gurenkov et al.

(10) Patent No.: US 11,314,927 B1
(45) Date of Patent: Apr. 26, 2022

(54) MANAGEMENT OF TRACKED CHANGES OBJECTS FOR CLOUD DOCUMENT EDITING

(71) Applicant: DocuSign, Inc., San Francisco, CA (US)

(72) Inventors: Stanislav Gurenkov, Carmel, IN (US); Andrew Weaver, Seattle, WA (US); Kocheng Hsiang, San Francisco, CA (US); Tingsen Xie, Mountain View, CA (US); Sean Smith, Foster City, CA (US); Deep Badesha, Union City, CA (US); Meyer Denney, Seattle, WA (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

(21) Appl. No.: 17/219,617

(22) Filed: Mar. 31, 2021

(51) Int. Cl.
| | |
|---|---|
| *G06F 16/93* | (2019.01) |
| *G06F 40/166* | (2020.01) |
| *H04L 67/02* | (2022.01) |
| *G06F 3/04845* | (2022.01) |
| *G06F 40/103* | (2020.01) |

(52) U.S. Cl.
CPC ........ *G06F 40/166* (2020.01); *G06F 3/04845* (2013.01); *G06F 40/103* (2020.01); *H04L 67/02* (2013.01)

(58) Field of Classification Search
CPC .. G06F 40/166; G06F 3/04845; G06F 40/103; H04L 67/02
See application file for complete search history.

(56) References Cited

U.S. PATENT DOCUMENTS

| | | | |
|---|---|---|---|
| 9,355,083 B1* | 5/2016 | Meran | G06F 40/146 |
| 2001/0018696 A1* | 8/2001 | Hori | G06F 40/106 |
| | | | 715/229 |
| 2005/0223325 A1* | 10/2005 | Naitou | G06F 40/166 |
| | | | 715/255 |
| 2008/0109717 A1* | 5/2008 | Krauter | G06F 40/166 |
| | | | 715/255 |
| 2014/0280463 A1* | 9/2014 | Hunter | H04L 67/10 |
| | | | 709/203 |
| 2015/0019960 A1* | 1/2015 | Kobayashi | G06F 40/166 |
| | | | 715/256 |
| 2015/0261732 A1* | 9/2015 | Kim | G06F 40/166 |
| | | | 715/229 |
| 2017/0017779 A1* | 1/2017 | Huang | G06F 40/106 |
| 2021/0133253 A1* | 5/2021 | Underwood | H04L 67/1097 |

* cited by examiner

*Primary Examiner* — Hassan Mrabi
(74) *Attorney, Agent, or Firm* — Fenwick & West LLP

(57) ABSTRACT

An online document system maintains a document comprising document content. Users can edit document of the online document system by in the form of operations (which represent desired changes to document content). Instead of directly applying the received operations to the document content, the online document system consolidates operations into a tracked change object based on a common intent of the operations. To render the document content (with tracked change object) the online document system applies the set of operations to the document content and generates a tracked change indication to highlight content changed by the set of operations.

20 Claims, 8 Drawing Sheets

MANAGEMENT OF TRACKED CHANGES OBJECTS FOR CLOUD DOCUMENT EDITING

BACKGROUND

This disclosure relates generally to tracking changes in a document, and, more specifically, to tracking changes in a cloud-based an online document system.

In some cases, user edits to an important document may need to be reviewed (or go through an approval process) before being incorporated into the current version of the document. For example, potential changes may need to be approved by a supervisor (or other authorized party), a representative of the other party in a negotiation over the contents of a document, or even an explicit approval by the user making the change.

However, preserving a clean version of a document while edits are proposed may require users to maintain separate working and final versions of the document. Therefore, a system is needed that allows users to make and view changes to a document without editing the underlying document content until changes are approved or otherwise accepted.

SUMMARY

An online document system maintains a document comprising document content. Users can edit a document of the online document system by performing editing operations (which represent desired changes to document content). Instead of directly applying the editing operations to the document content, the online document system consolidates the operations into a tracked change object based on a common intent of the operations. To render the document content (with tracked change object), the online document system applies the set of operations to the document content and generates a tracked change indication to highlight content changed by the set of operations.

Figure 1:
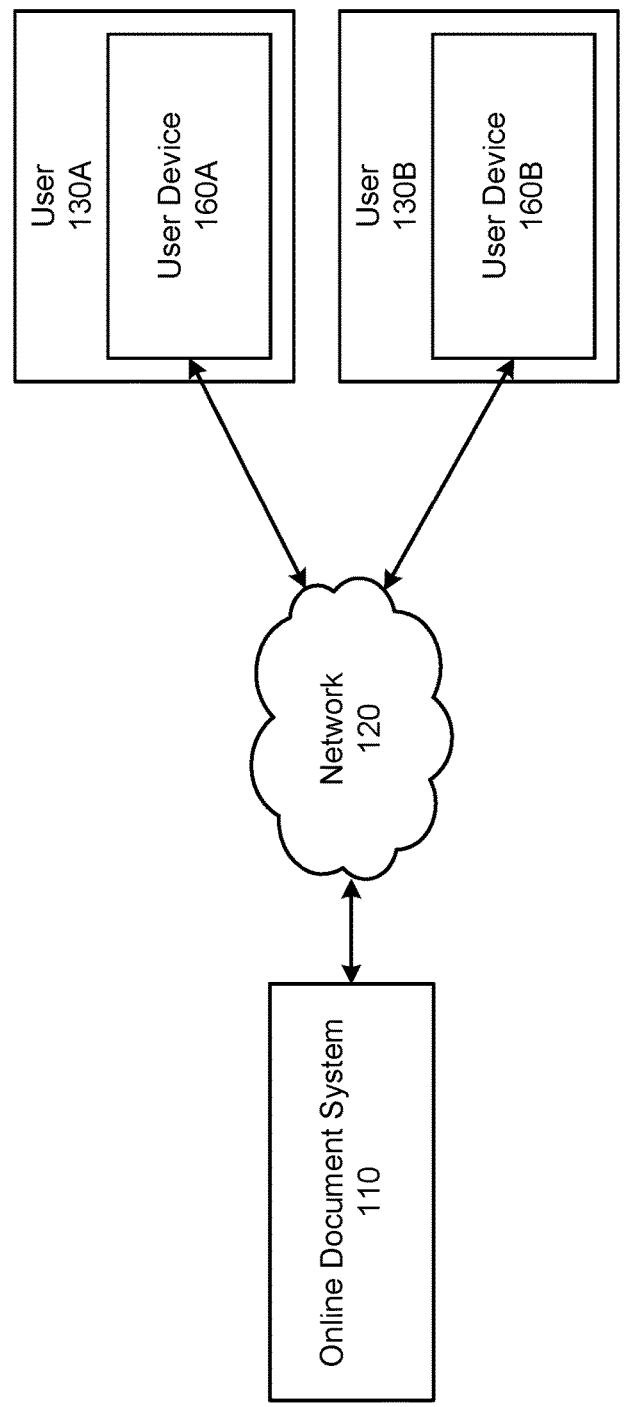
FIG. 1 is a block diagram of a system environment in which an online document system operates, according to one embodiment.

The figures depict various embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "130A," indicates the text refers specifically to the element having that particular reference numeral. A reference numeral in the text without a following letter, such as "130," refers to any or all of the elements in the figures bearing that reference numeral (e.g., "130" in the text refers to reference numerals "130A" and "130B" in the figures).

DETAILED DESCRIPTION

Overview

An online document system can facilitate the creation, negotiation, and management of documents by one or more users of the online document system. For example, the online documents system can allow users to create, edit, review, and negotiate document content with other users of the online document system.

An online document system can include a tracked changes system to manage current and provisional edits to documents, a version management system to maintain a record of previous versions and edits to stored documents, and a permissions system controlling user access to documents. In some embodiments, the online document system tailors the user interface view of a document based on the current document content and any tracked change objects associated with the document.

In some embodiments, tracked changes for a document are stored separately from the current state of the document content in a set of tracked change objects. Each tracked change object may include a set of operations linked to certain nodes or positions within the document content. To render a document, the online document system can retrieve the current document content, apply the operations of any associated tracked change objects, then display content reflecting the document with the tracked changes applied. Similarly, tracked changes (and/or document content associated with a tracked change) can be decorated or otherwise made known to the user in an editing user interface (using, for example, underlining, colored text, strikethrough, or other markup to indicate changed content).

To generate a tracked change object, the online document system can group operations as they are received from a user editing document content based on the inferred intent of the user in making those operations (for example, grouping repeated deletion operations into a single delete operation). When a tracked change is accepted or otherwise authorized to be fully incorporated into the document, the online document system can apply the stored operations to the document content, recreating the intent of the user when making the tracked change.

Online Document System Architecture

FIG. 1 is a block diagram of a system environment in which an online document system operates, according to one embodiment. The system environment 100 shown by FIG. 1 comprises an online document system 110, a network 120, and a set of users 130 each associated with a user device 160 (including the user 130A and the user 130B associated with the user devices 160A and 160B, respectively). In alternative configurations, different and/or additional components may be included in the system environment 100.

The online document system (ODS) 110 is a computer system (or group of computer systems) for storing and managing documents for a set of users 130. Using the online document system 110, users 130 can collaborate to create, edit, review, and negotiate documents. For example, the online document system 110 can enable the creation of a contract, agreement, press release, technical specification, or other documents. In some implementations, the ODS 110 tracks changes made to documents by users 130 and allows any tracked changes to be approved, altered, or incorporated into the full document. The ODS 110 can be a server, server group or cluster (including remote servers), or another suitable computing device or system of devices. In some implementations, the ODS 110 can communicate with user devices 160 over the network 120 to receive instructions and send documents (or other information) for viewing on user devices 160. The ODS 110 can assign varying permissions to individual users 130 or groups of users 130 controlling which documents a user 130 can interact with and what level of control the user 130 has over the documents they have access to. The ODS 110 will be discussed in further detail with respect to FIG. 2.

The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, 3G, 4G, code division multiple access (CDMA), digital subscriber line (DSL), and the like. Data exchanged over the network 120 may be represented using any suitable format, such as hypertext markup language (HTML) or extensible markup language (XML). In some embodiments, all or some of the communication links of the network 120 may be encrypted using any suitable technique or techniques.

Through the network 120, the online document system 110 can communicate with user devices 160 associated with users 130. A user 130 can represent an individual, automated system, or group, able to interact with documents (or other content) generated on and/or managed by the online document system 110. Each user 130 can be associated with a username, email address, or other identifier that can be used by the ODS 110 to identify the user 130 and (via permissions) control the ability of the user 130 to view and modify documents managed by the ODS 110. In some implementations, users 130 can interact with the ODS 110 through a user account with the ODS 110 and one or more user devices 160 accessible to that user 130. In some implementations, the set of users 130 can also include AIs, bots, scripts, or other automated processes set up to interact with the ODS 110 in some way. According to some embodiments, users are associated with permissions definitions defining actions users 130 can take within the ODS 110, or on documents, templates, permissions associated with other users and/or workflows.

The user device 160 associated with a user 130 is a computing device capable of receiving user input (for example from a user 130) as well as transmitting and/or receiving data to the ODS 110 via the network 120, according to some embodiments. For example, a user device 160 can be a desktop or a laptop computer, a smartphone, tablet, or another suitable device. User devices 160 are configured to communicate via the network 120 (for example, with the ODS 110). In one embodiment, a user device 160 executes an application allowing a user 130 of the user device 160 to interact with the ODS 110. For example, a user device 160 can execute a browser application to enable interaction between the user device 160 and the ODS 110 via the network 120. A single user 130 can be associated with multiple user devices 160, in some embodiments. Similarly, one user device 160 can be shared between multiple users 130 who may, for example, log into a personal account on the user device 160 to access the online document system 110, according to some embodiments.

Figure 2:
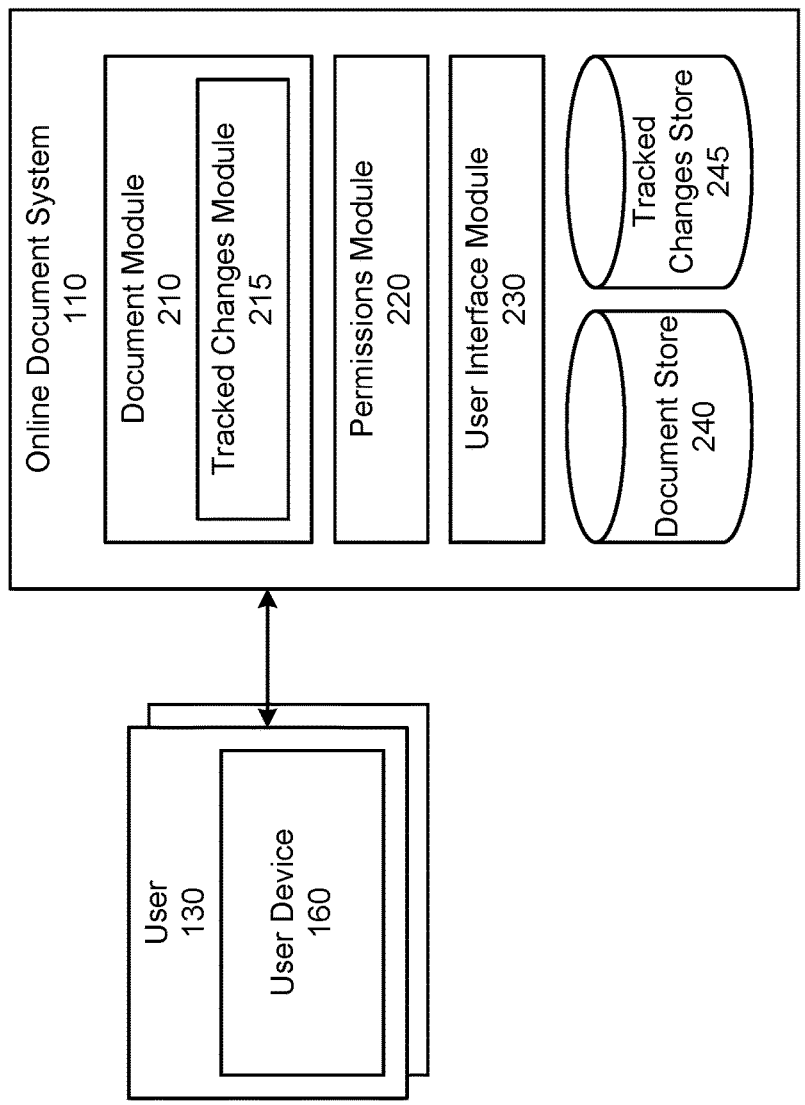
FIG. 2 is a block diagram of an online document system, according to one embodiment.

FIG. 2 is a block diagram of an online document system, according to one embodiment. The environment 200 of FIG. 2 shows an ODS 110 including a document module 210 including a tracked changes module 215, a permissions module 220, a user interface (UI) module 230, a document store 240, and a tracked changes store 245. The environment 200 additionally includes user 130 with a corresponding user device 160 communicatively connected to the ODS 110. Conventional components such as network interfaces, security functions, load balancers, failover servers, management and network operations consoles, and the like are not shown in FIG. 2 so as to not obscure the details of the system architecture.

In some implementations, the document module 210 creates, manipulates, and manages documents associated with the ODS 110. For example, the document module 210 can generate new documents, manage and update documents stored by the ODS 110, track potential changes to existing documents, and/or maintain a record of previous versions of documents within the ODS 110.

In some implementations, the document module 210 allows users 130 to upload new documents, make changes to existing documents, and/or view existing documents (including past versions of document and metadata about documents). Each document of the ODS 110 can be associated with document content (the text, images, video content, formatting information, etc. used in a rendered version of the document) as well as document metadata such as a label or identifier, a version history of previous versions of the document, and/or permissions for one or more users 130. In some embodiments, document content of a document is broken up into one or more nodes, each containing different subsets of content for the document. For example, a node can store content for a paragraph, sentence, list, or image to be included within a document. During editing, nodes may be added, deleted, or rearranged by the document module 210 and node content can be modified.

When a user is editing a document, the document module 210 can interpret user input impacting document content as a series of operations, each linked to one or more nodes (or other indicators of position within a document), an operation type, and changes to the document content. An operation, as used herein, is an instruction for changing the content of a document. In some implementations, an operation include a position identifier (identifying specific content, a node, or a position within a document), an operation type indicating a type of action to be performed (for example, insertion, deletion, or formatting operation types), and an operation payload of content or content properties to change. In some embodiments, the structure of an operation payload depends on the operation type (insertion-type operations can have payloads of text or other content to insert while the payloads of formatting-type operations may be property values to set for the associated node). For example, an insertion-type operation can include an operation payload of content to insert at a node identified by the position identifier of the operation.

In the environment 200, the document module 210 includes a tracked changes module 215 that creates and manages tracked change objects for documents of the ODS 110. A tracked changes object, as used herein, is a data structure containing metadata reflecting one or more changes to the current document content sharing a common intent. In some implementations, each tracked change object includes a set of operations with a common intent for (or otherwise groups together) and a tracked change type identifying the common intent for the tracked change object. In some embodiments, tracked change objects containing only operations of a single type are assigned a basic tracked change type corresponding to the operation type, for example, a tracked change object including only deletion-type operations can be associated with a deletion type. In some implementations, tracked changes are associated with complex tracked change types based on an inferred intent of the user in performing the associated operations. The tracked changes module 215 can combine operations (sometimes of different types) associated with multiple tracked change objects to generate complex type tracked change objects. For example, the tracked changes module 215 can combine a tracked change object associated with insertions to a position and a tracked change object associated with deletions to the same position to generate a tracked change object (containing both insertion and deletion operations) of a "replacement" type (reflecting a user's inferred intent to replace the deleted content with the inserted content). The tracked changes module 215 can modify the node structure of a document to accommodate operations associated with tracked change objects (for example, adding a node to contain a new section inserted in a tracked change object).

As described above, the document module 210 can interpret user input as an operation of a set of operation types. For example, operations can include insertion operations (adding text or other content to a node), deletion operations (deleting text or other content), and formatting operations (changing one or more properties of a node or of content within a node). As operations are received from a user 130, the tracked change module 215 can process and combine operations received from a user into tracked change objects associated with that basic operation type. For example, if a user 130 selects and changes the formatting of a phrase (such as by making the phrase italic), the tracked change module then generates a corresponding formatting-type tracked change object containing the formatting operation.

In some implementations, if a user 130 performs a repeated operation, (for example, when deleting a word one character at a time using repeated presses of the 'delete' key) the tracked changes module 215 can automatically combine the repeated operations into a single tracked change object including the repeated operations (such as a single delete-type tracked change object containing the repeated the series of deletion operations). In some embodiments, operations are consolidated into tracked change objects based on proximity (within the edited document), the user 130 making the changes, and/or consecutive performance of operations of the same type. For example, same-type operations to the same node, paragraph, or sentence can be consolidated if performed consecutively or within a threshold time of an operation previously associated with the tracked change object. Additionally, the tracked change module 215 can consolidate multiple basic type tracked change objects into a complex type tracked change object reflecting an inferred intent of the user 130.

To infer an intent common to a set of operations or tracked change objects (containing operations), the tracked change module 215 can analyze the user 130 associated with each operation, the operation type of each operation, the proximity of operations, the time of each operation, the type of the document, content added or deleted in the operations, and other suitable factors. Based on the analysis, the tracked change module 215 can assign the combined set of operations a common intent and consolidate the associated operations into a complex type tracked change object associated with the common intent. Inferred intents can include, for example, a replacement intent, where a user is inferred to be replacing certain content with a revised version of the same content.

As described above, after a tracked change object is accepted the operations associated with the accepted tracked change object are applied to the document content (in some implementations, as if they were being executed by the user 130 at the time the tracked change object was accepted). In some implementations, the document module 210 maintains a version history recording applied to a document. For example, the document module 210 can store a version history of changes to a document (for example, resulting from accepted tracked changes). A version history can include a record of previous changes to the document, a time and/or date when each change was made, and an identifier of the user 130 made each change.

The document store 240 is a file storage system, database, set of databases, or other data storage system storing documents, document clauses, version histories, and other information about documents managed by the ODS 110. The document store 240 can be a database implemented on a computing system local to the ODS 110, can be a remote or cloud-based database, or can be implemented using any other suitable hardware or software implementation. Similarly, the tracked changes store 245 is a file storage system, database, set of databases, or other data storage system storing tracked changes objects and/or other information about tracked changes for documents of the ODS 110. The tracked changes store 245 can be a database implemented on a computing system local to the ODS 110, can be a remote or cloud-based database, or can be implemented using any other suitable hardware or software implementation.

The permission module 220 can manage and enforce user permissions for documents of the ODS 110. As described above users 130, groups of users 130, and documents can be associated with permissions controlling which actions users 130 can take within the ODS 110. In some implementations, permissions managed by the permissions module 220 explicitly reference a specific user 130 (for example, by name or user identifier), but permissions can also be assigned to users 130 based on membership in a group or subgroup of users 130 or based on a characteristic of the user 130. The permission module 220 can store permissions in a set of "permission definitions" storing permissions for a user 130 (or group of users). In some implementations, each permission definition stores a description of one or more permissions (for example, editing or viewing permissions) and identification of the set of users 130 the permission definition applies to. Similarly, a permission definition can define the documents the permission definition applies to. In some embodiments, the permissions module 220 can intervene when a user 130 attempts to take an action they don't have permission for, for example by displaying a notification message informing the user 130 of the lack of permission and identifying or notifying another user 130 who does have permission to perform the desired action.

The permission module 220 can assign permissions to view, edit, approve edits to, or otherwise modify documents managed by the ODS 110. In some implementations, editing permissions include "full edit" permissions granting a user 130 the ability to make and save changes to the content of the clause and "tracked edit" permissions allowing a user 130 to make changes which are tracked but not incorporated into the document until an appropriate user 130 approves the tracked changes (for example, a user with corresponding "approval" permissions). Similarly, the permission module 220 can assign other permissions, such as a "view only" permission (which allows a user 130 to view but not edit). In some implementations, the permissions module 220 also includes permissions which allow users 130 to modify the permissions granted to other users.

The UI module 230 can generate user interfaces allowing users 130 to interact with documents managed by the ODS 110, according to some embodiments. For example, the UI module 230 can receive user instructions from a web-based application with integrated document content editing interacted with by a user 130. In some implementations, the UI module 230 can provide a user interface enabling users 130 to add, delete, or modify the contents of a negotiated document or documents clause based on one or more permission definitions. A UI provided by the UI module 230 can allow users to modify content such as text, images, links to outside sources of information such as databases, and the like. In some implementations, the UI module 230 can provides user interfaces or user interface modes allowing users 130 to create, view, and accept tracked changes associated with a document. For example, the UI module can provide a "tracked changes mode" or "suggestion mode" user interface in which edits from a user 130 are used to generate tracked change objects (instead of modifying the original content of the document). Similarly, the UI module 230 can provide a UI for authorized users 130 to view or modify permissions definitions granting permissions to other users 130. The user interface module 230 and example user interfaces will be discussed further below in relation to FIGS. 3-4.

Example Document Editing Interfaces

Figure 3:
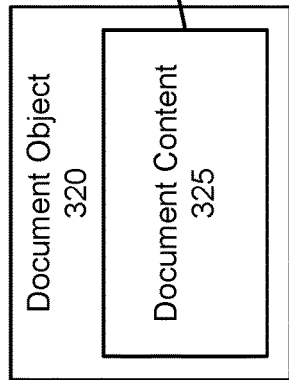
FIG. 3 illustrates an example user interface for editing documents in an online document system, according to one embodiment.

As described above, the UI module 230 can present a UI to users 130 allowing the users 130 to interact with the ODS 110 (for example, to create, view, negotiate, and/or modify documents with tracked changes). FIG. 3 illustrates an example user interface for editing documents in an online document system, according to one embodiment. The document editing interface 300 illustrated in FIG. 3 includes a document editing area 310 displaying document content 325 of a document object 320. In alternative configurations, different and/or additional user interface elements may be included in the document editing interface 300.

In the embodiment of FIG. 3, the document editing area 310, according to some embodiments, allows a user to view, enter, edit, and/or delete document content. In some implementations, the document editing area 310 provides text editing and/or formatting features for entering and manipulating document content (for example, font size, line spacing, and the like). Similarly, the document editing interface 300 can include additional UI elements enabling authorized users 130 to modify or add other types of document content 325, such as images or videos. In some implementations, the document editing interface 300 includes additional functionality allowing users to interact with tracked changes for the displayed document, or modify the permissions of a document, such as by adding, removing, or modifying permission definitions associated with the document.

Figure 4A:
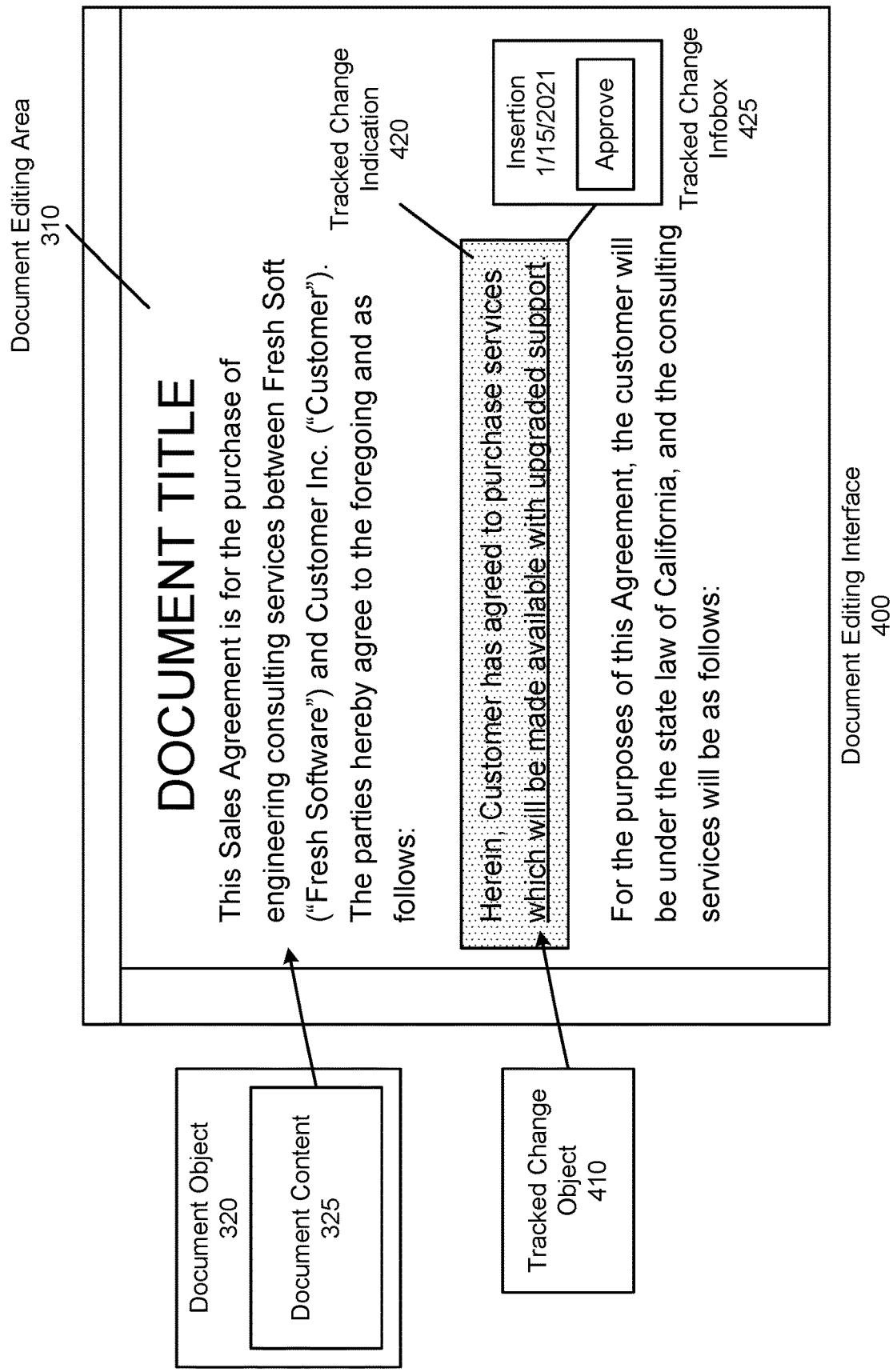
FIG. 4A illustrates an example user interface for editing documents having tracked changes, according to one embodiment.

As described above, depending on a mode of the document editing interface 300 and/or permissions associated with the editing user 130, the ODS 110 can display documents including tracked changes stored in tracked change objects. When editing a document, changes can be made to the document content 325 directly, or changes can be stored in tracked changes objects as described above. FIG. 4A illustrates an example user interface for editing documents having tracked changes, according to one embodiment. FIG. 4A shows an alternative view of the document editing interface 400 including tracked changes. The document editing interface 300, as shown in FIG. 4A, includes a document editing area 310 document displaying document content 325 of a document object 320 modified based on a tracked change object 410. In some implementations, the content modified/added by a tracked change object 410 is indicated to viewing users by a tracked change indication 420 and tracked change infobox 425.

As described above, a document object 320 can be associated with a set of tracked change objects (such as the tracked change object 410) containing changes to the document content 325 that are provisional or otherwise not yet incorporated into the document content 325. In the document editing interface 400, the displayed content reflects a tracked change object 410 that contains operations adding a phrase ("which will be made available with upgraded support") to an existing sentence contained in the document content 325. The UI module 230 can, in some implementations, indicate that content originates from (or is modified by) one or more tracked change objects 410 by displaying a corresponding tracked change indication 420 on or proximate to the associated content. A tracked change indication 420 can include markup or formatting styles applied to modified content, for example, indicating inserted or deleted characters using underline for inserted characters and strikethrough for deleted characters. In some embodiments, the tracked change module 215 modifies the document content 325 and assigns tracked change indications to document content 325 that is added, deleted, or otherwise affected operations of the tracked change object 410. In some implementations, the tracked change module 215 generates display content by sequentially merging each operation of the tracked change object 410 with the document content 325. To merge an operation, the tracked change module 215 can, apply the operation (as if the tracked change had been accepted) and/or applies an appropriate style or decorator to content affected by the operation. For example, if an operation of the tracked change object 410 deletes a set of characters, the tracked change module 215 can assign deleted characters a strikethrough markdown style (instead of simply deleting the characters). Similarly, a tracked change indication 420 can delineate the clause, sentence, paragraph, or region of the document content 325 modified by the tracked change object 410 using a decorator such as a background color, highlight, and/or border surrounding the modified content.

In some implementations, a tracked change indication 420 includes a tracked change infobox 425 proximate to content modified by the tracked change object 410. A tracked change infobox 425 can be an overlaid icon, a margin identifier, or a text box or bubble (as shown in FIG. 4A). A tracked change infobox 425 may contain relevant information about the tracked change object 410, such as an author of the tracked changes, a type of the tracked change object 410 (such as insertion, deletion, replacement, format change, etc.), and a date the tracked change was made. In some implementations, a tracked change infobox includes functionality allowing authorized users 130 to accept or reject the tracked change 410 (and have the tracked change object 410 integrated into the document content 425 or deleted). In the embodiment of FIG. 4A, users 130 can approve tracked changes using an "approve tracked change button," but in other embodiments, this function may be accessed through a contextual menu of the tracked change infobox 425, or the like.

Figure 4B:
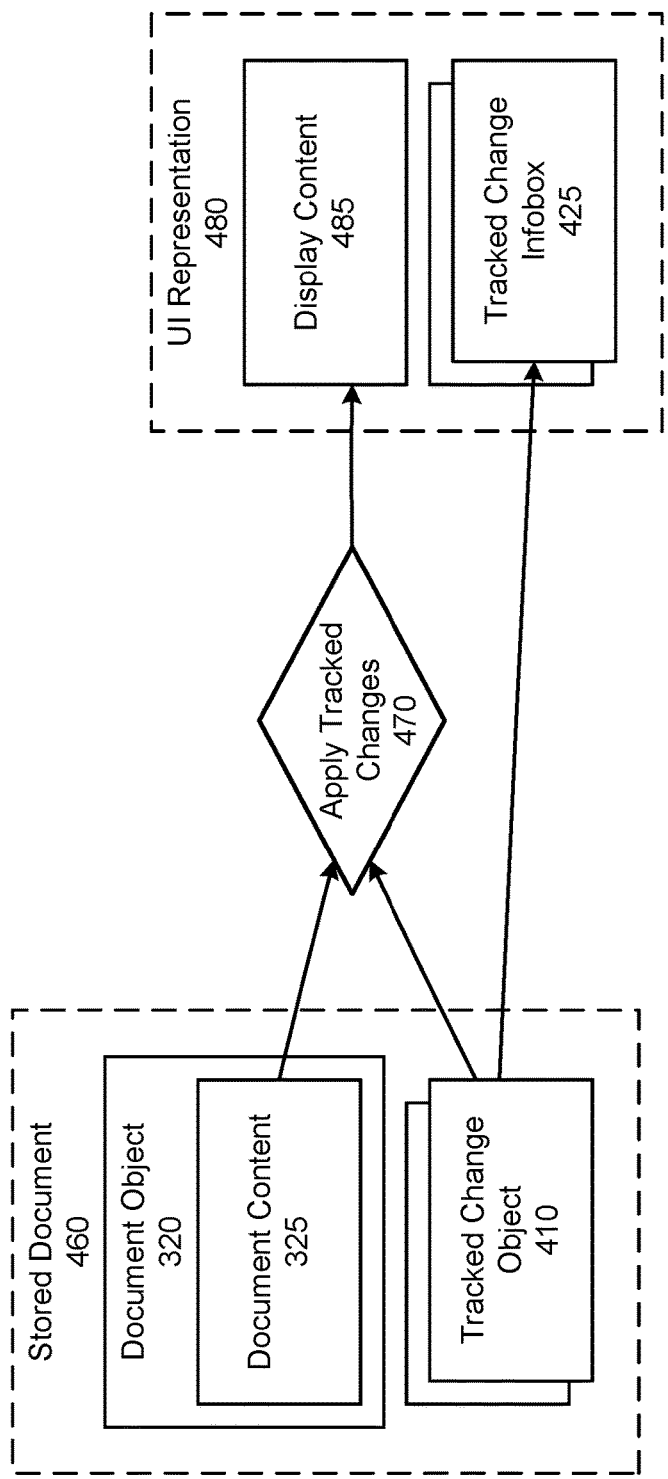
FIG. 4B illustrates an example procedure for displaying documents associated with tracked changes in a user interface.

FIG. 4B illustrates an example procedure for displaying documents associated with tracked changes in a user interface. FIG. 4B includes a stored document 460 including a document object 320 with document content 325 as well as a set of tracked change infoboxes 425, a step for applying tracked changes 470, and a UI representation 480 including display content 485 and a set of tracked change indications 420.

As described above, the ODS 110 can separately store document objects 320 (including the current state of document content 325) and tracked change objects 410 containing provisional changes or revisions to document content 325. Therefore, a stored document 460 in the ODS 110 can include a document object 320 and (optionally) a set of tracked change objects 410 for pending changes to the document. To render a document with tracked changes visible (as shown in FIG. 4A), the UI module 230 can take the stored document 460 and temporarily apply 470 any tracked change objects 410 to the document content 325 of the document object 320 to generate display content 485 for display in the UI representation 480 of the stored document 460. As described above, the display content 485 may contain tracked change indications 420 highlighting content modified by a tracked change object. In some implementations, the UI module 230 additionally generates a set of tracked change infoboxes 425 for the UI representation 480 based on the set of tracked change objects 410.

Tracked Changes Processes

Figure 5:
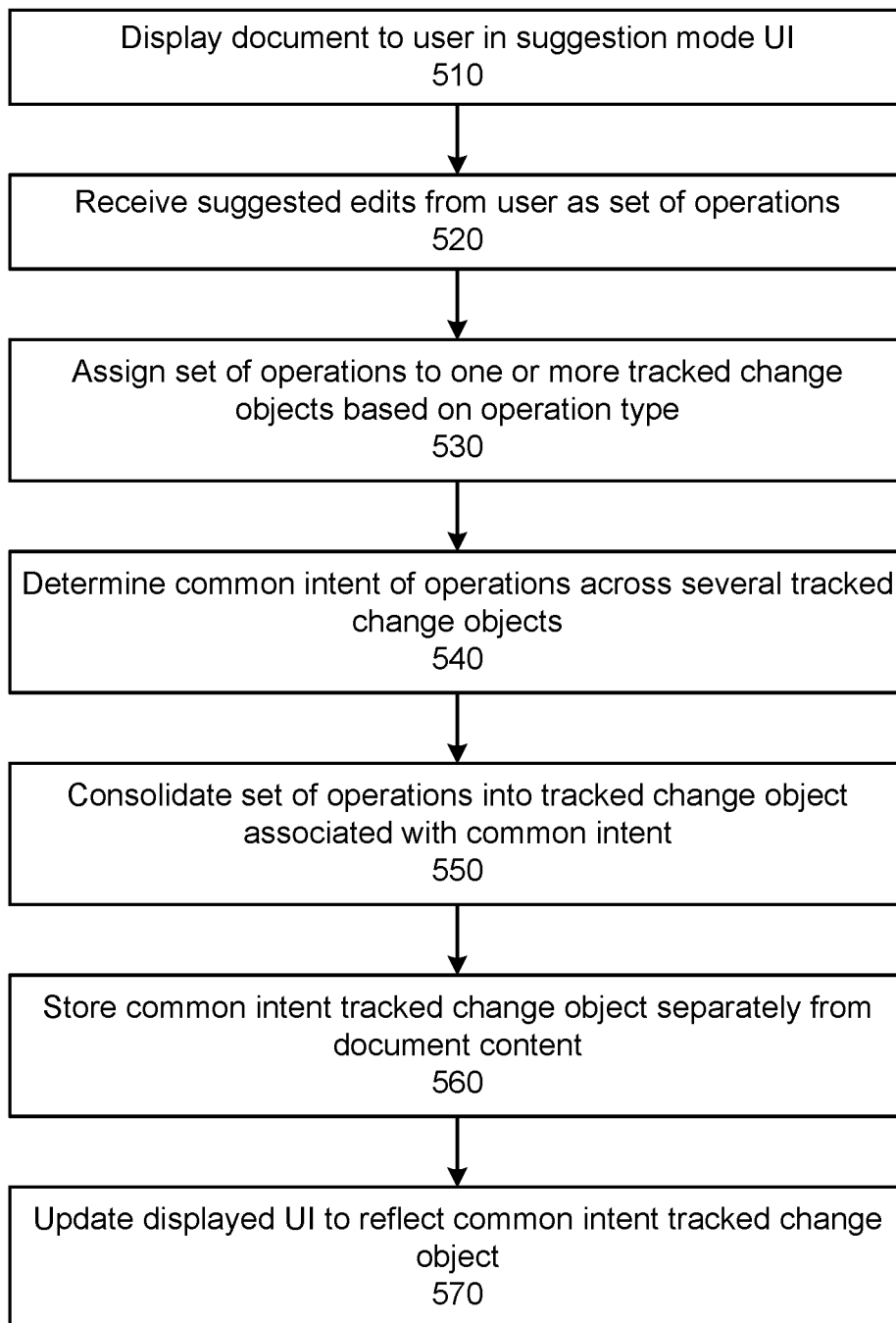
FIG. 5 is a flowchart illustrating a process for generating tracked change objects based on user edits to a document, according to an embodiment.

FIG. 5 is a flowchart illustrating a process for generating tracked change objects based on user edits to a document, according to an embodiment. The process 500 begins when the ODS displays 510 a document to a user via a suggestion mode UI. For example, the ODS can select to display a suggestion mode UI based on a selection by the user of the suggestion mode (over a direct edit mode that does not use tracked changes), permissions assigned to the user, the document already being associated with tracked change documents, or the like. Through the UI, the ODS receives 520 suggested edits to document content from the user in the form of operations (each associated with an operation type). As described above, the set of operations can be input sequentially as the user performs editing actions through the UI. Operations of the set of operations are then assigned 530 to one or more tracked change objects based, for example, on the operation type of that operation (among other criteria as described above). The ODS then determines 540 a common intent of operations across a set of tracked change objects and consolidates 550 the operations into an operation associated with the common intent. The common intent tracked change object is then stored 560 separately from current document content and the displayed UI is updated 570 to reflect the new common intent tracked change object.

Figure 6:
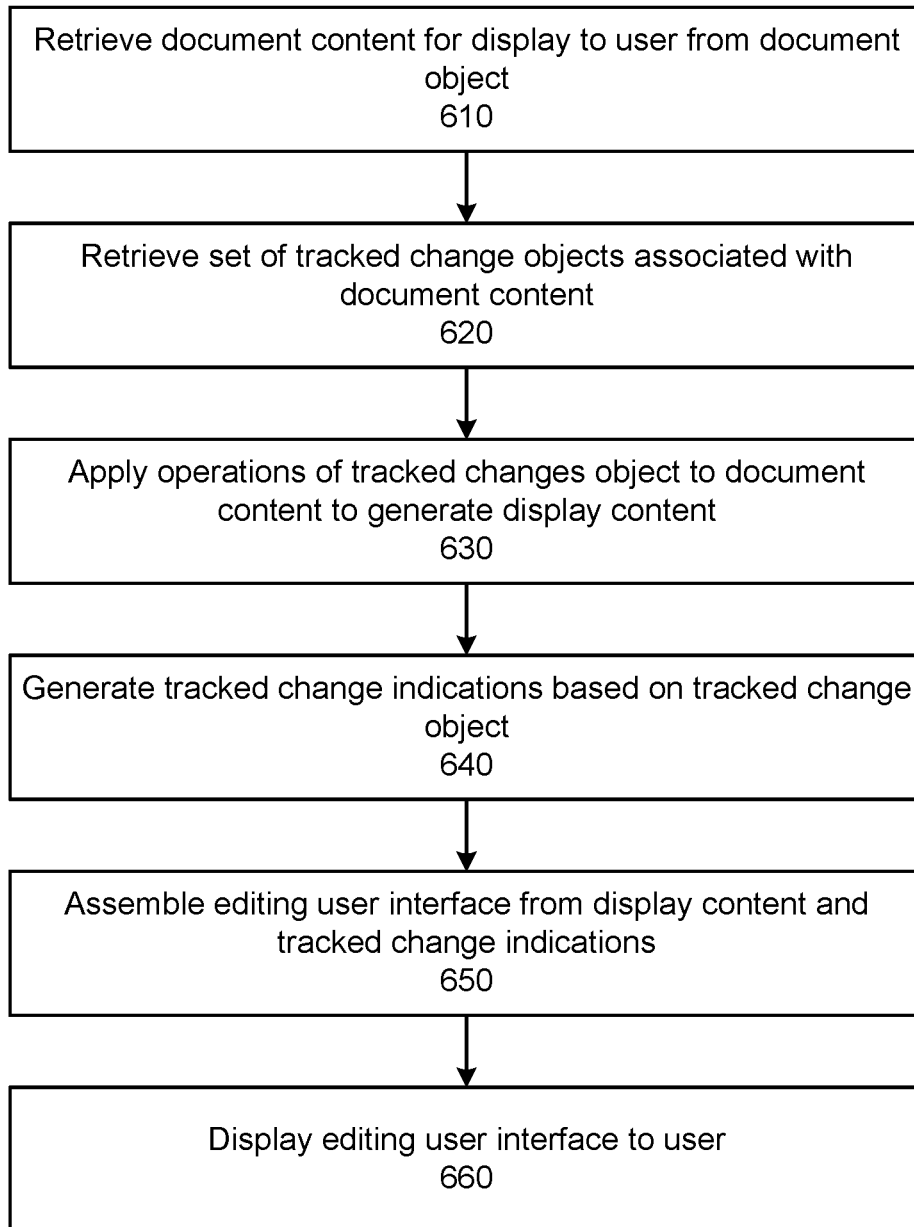
FIG. 6 is a flowchart illustrating a process for displaying a document associated with tracked change objects, according to an embodiment.

FIG. 6 is a flowchart illustrating a process for displaying a document associated with tracked change objects, according to an embodiment. The process 600 begins when the ODS retrieves 610 document content (for example, from a document object) for display to a user. The ODS then retrieves 620 a separate set of tracked change objects associated with the document content. To generate display content, the ODS applies 630 the set of operations of the tracked changes object to the document content. For example, this process can create a version of the document content as if some or all tracked change objects were accepted. The ODS then generates 640 a set of tracked change indications corresponding to the tracked change objects and assemble 650 an editing user interface including the display content and the tracked change indications. Finally, the ODS displays 660 the editing user interface to the user.

Figure 7:
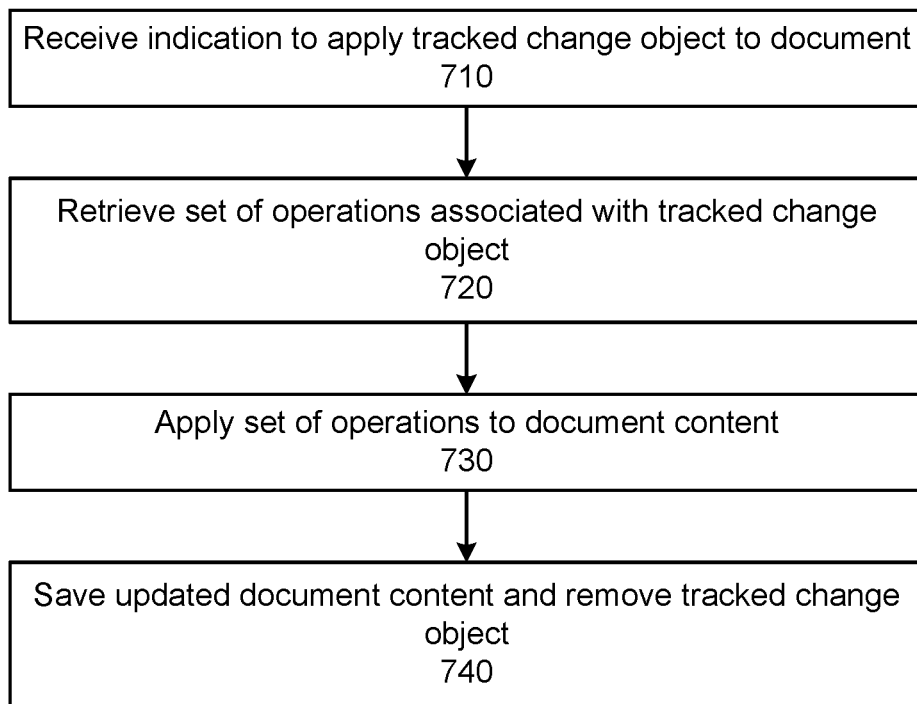
FIG. 7 is a flowchart illustrating a process for applying tracked change objects to a document, according to an embodiment.

FIG. 7 is a flowchart illustrating a process for applying tracked change objects to a document, according to an embodiment. The process 700 begins when the ODS receives 710 an indication to apply a tracked change object to a document (for example, in response to a user clicking on an "approve change" button within an editing user interface. The ODS then retrieves 720 the set of operations associated with the tracked change object and applies 730 the set of operations to the document content of the document. Then, the ODS saves 740 the updated document content in the document object and remove the applied tracked change object.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining, at a document management system, a document comprising document content;
   receiving, via a document editing interface presented by the document management system, a first edit to the document from an editing user, the first edit comprising a first set of operations for altering the document content;
   receiving, via the document editing interface, a second edit to the document from the editing user, the second edit comprising a second set of operations for altering the document content different from the first set of operations;
   determining, at the document management system, a common intent of the editing user in making the first and second edits based on the first and second sets of operations;
   responsive to determining the common intent of the user, generating a tracked change object associated with the document, the tracked change object comprising the common intent and a combined set of operation comprising the first and second sets of operations; and
   rendering, for display to a viewing user, the document by:
      displaying, by the document management system, the document content of the document within a document interface; and
      modifying the display of the document content within the document interface to indicate the combined set of operations from the tracked change object relative to the retrieved document content and to include text describing the common intent of the user in association with the combined set of operations.

2. The method of claim 1, further comprising:
   receiving an indication to apply the tracked change object to the document; and
   applying the tracked change object to the document.

3. The method of claim 2, wherein receiving an indication to apply the tracked change object to the document comprises:
   retrieving the combined set of operations associated with the tracked change object; and
   sequentially applying each operation of the combined set of operations to the document content.

4. The method of claim 3, wherein sequentially applying the tracked change object to the document comprises:
   receiving an input from an approving user through the document interface.

5. The method of claim 1, wherein modifying the display of the document content comprises displaying a tracked change infobox proximate to content modified by the combined set of operations.

6. The method of claim 1, wherein modifying the display comprises generating display content by applying the combined set operations to the document content.

7. The method of claim 6, wherein applying the combined set operations to the document content to generate display content comprises adding a tracked change indication to modified content.

8. The method of claim 7, wherein adding a tracked change indication comprises assigning modified display content a markdown text style based on a type of an operation modifying the content.

9. The method of claim 7, wherein adding a tracked change indication comprises applying a decoration to display content affected by the tracked change object.

10. The method of claim 1, wherein the tracked change object is stored separately from the document content.

11. A non-transitory computer readable storage medium comprising instructions which, when executed by a processor, cause the processor to perform the steps of:
    maintaining, at a document management system, a document comprising document content;
    receiving, via a document editing interface presented by the document management system, a first edit to the document from an editing user, the first edit comprising a first set of operations for altering the document content;
    receiving, via the document editing interface, a second edit to the document from the editing user, the second edit comprising a second set of operations for altering the document content different from the first set of operations;
    determining, at the document management system, a common intent of the editing user in making the first and second edits based on the first and second sets of operations;
    responsive to determining the common intent of the user, generating a tracked change object associated with the document, the tracked change object comprising the common intent and a combined set of operation comprising the first and second sets of operations; and
    rendering, for display to a viewing user, the document by:
       displaying, by the document management system, the document content of the document within a document interface; and
       modifying the display of the document content within the document interface to indicate the combined set of operations from the tracked change object relative to the retrieved document content and to include text describing the common intent of the user in association with the combined set of operations.

12. The non-transitory computer readable storage medium of claim 11, wherein the steps further comprise:
    receiving an indication to apply the tracked change object to the document; and
    applying the tracked change object to the document.

13. The non-transitory computer readable storage medium of claim 12, wherein receiving an indication to apply the tracked change object to the document comprises:
    retrieving the combined set of operations associated with the tracked change object; and
    sequentially applying each operation of the combined set of operations to the document content.

14. The non-transitory computer readable storage medium of claim 13, wherein sequentially applying the tracked change object to the document comprises:
    receiving an input from an approving user through the document interface.

15. The non-transitory computer readable storage medium of claim 11, wherein modifying the display of the document content comprises displaying a tracked change infobox proximate to content modified by the combined set of operations.

16. The non-transitory computer readable storage medium of claim 11, wherein modifying the display comprises generating display content by applying the combined set operations to the document content.

17. The non-transitory computer readable storage medium of claim 16, wherein applying the combined set operations to the document content to generate display content comprises adding a tracked change indication to modified content.

18. The non-transitory computer readable storage medium of claim 17, wherein adding a tracked change indication comprises assigning modified display content a markdown text style based on a type of an operation modifying the content.

19. The non-transitory computer readable storage medium of claim 17, wherein adding a tracked change indication comprises applying a decoration to display content affected by the tracked change object.

20. A system comprising:
a processor; and
   a non-transitory computer readable storage medium comprising instructions which, when executed by the processor, cause the processor to perform the steps of:
      maintaining, at a document management system, a document comprising document content;
      receiving, via a document editing interface presented by the document management system, a first edit to the document from an editing user, the first edit comprising a first set of operations for altering the document content;
      receiving, via the document editing interface, a second edit to the document from the editing user, the second edit comprising a second set of operations for altering the document content different from the first set of operations;
      determining, at the document management system, a common intent of the editing user in making the first and second edits based on the first and second sets of operations;
      responsive to determining the common intent of the user, generating a tracked change object associated with the document, the tracked change object comprising the common intent and a combined set of operation comprising the first and second sets of operations; and
      rendering, for display to a viewing user, the document by:
      displaying, by the document management system, the document content of the document within a document interface; and
      modifying the display of the document content within the document interface to indicate the combined set of operations from the tracked change object relative to the retrieved document content and to include text describing the common intent of the user in association with the combined set of operations.

* * * * *